UNITED STATES PATENT OFFICE.

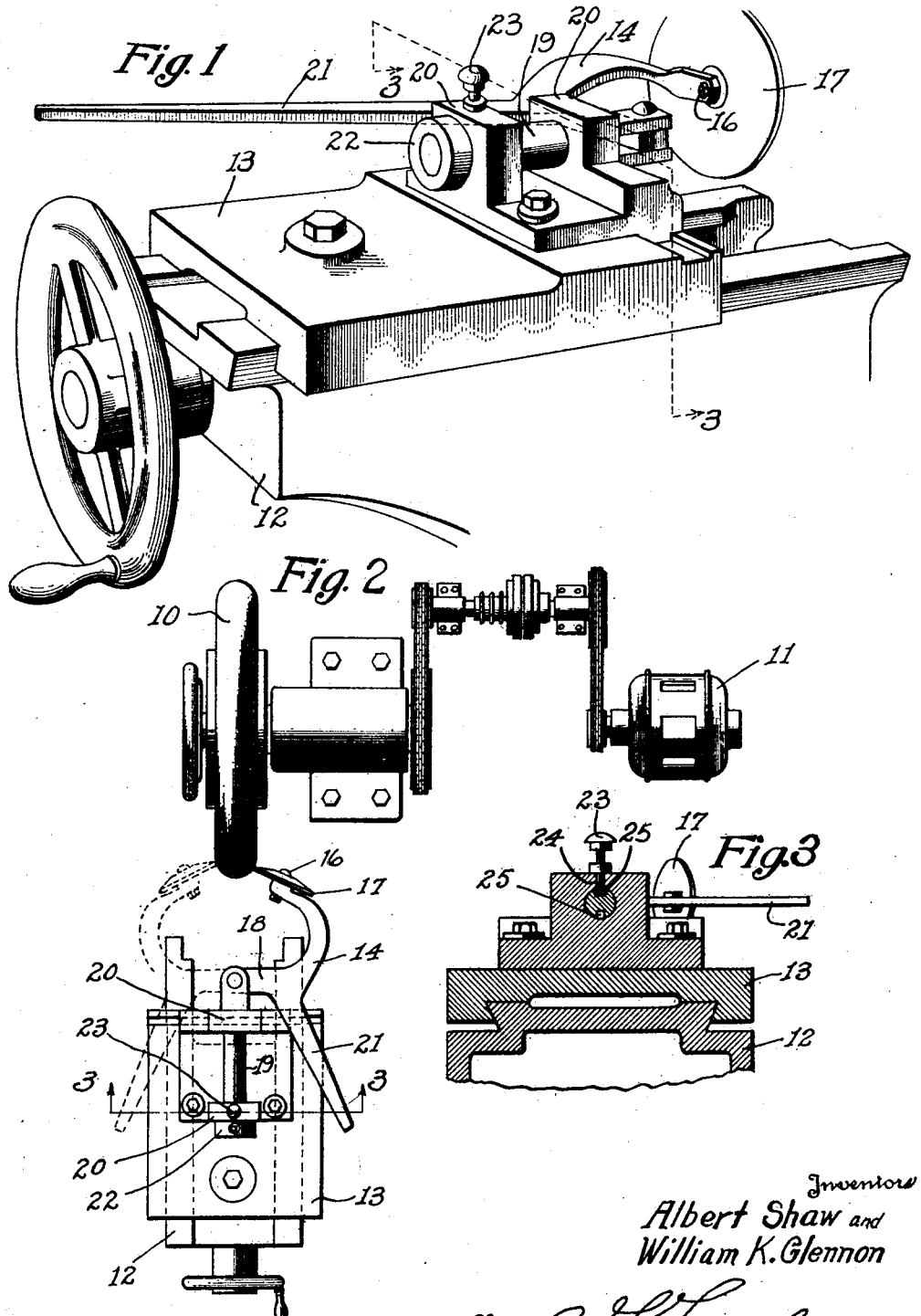

ALBERT SHAW AND WILLIAM K. GLENNON, OF AKRON, OHIO, ASSIGNORS TO THE GOODYEAR TIRE & RUBBER COMPANY, OF AKRON, OHIO, A CORPORATION OF OHIO.

TIRE-MAKING MACHINE.

1,409,792.  Specification of Letters Patent.  Patented Mar. 14, 1922.

Application filed September 12, 1919. Serial No. 323,249.

*To all whom it may concern:*

Be it known that we, ALBERT SHAW and WILLIAM K. GLENNON, citizens of the United States, and residents of Akron, Ohio, have invented new and useful Improvements in Tire-Making Machines, of which the following is a specification.

Our present invention relates to an improvement in tire making machines and has particular reference to an improved mechanism for making cord tire carcasses of the pneumatic type.

The many important objects and advantages of our improved device will be readily apparent from a perusal of the accompanying drawings, specification and claims wherein there is illustrated one of many possible embodiments and utilization of the device.

In the drawings—

Figure 1 is a perspective view of the fabric working mounting;

Figure 2 is a top plan of the complete machine showing one position in full lines and the other position in dotted lines; and Figure 3 is a vertical section on line 3—3 of Figures 1 and 2.

In the accompanying drawing the type of tire machine which is conventionally illustrated is that more largely used commercially, but we desire it, of course, to be understood that our improved fabric working element and the mounting therefor is not limited to use in connection with a machine of this type, but may be used in connection with any other tire making machine of a modified type which embodies the essential elements of a driven core and a fabric working mechanism.

Referring to the drawing and particularly to Figure 2, the numeral 10 designates a revoluble core, driven through a suitable connection by a motor 11, the driving mechanism being so arranged as to permit reversing the direction of rotation of the core at will, as, for example, by reversal of the electric motor shown.

The fabric shaping element comprises a base 12 upon which is slidably mounted, for reciprocation toward and away from the core, a slide or carriage 13. Upon the forward end of the carriage 13 is a supporting arm 14, to the free end of which is secured a work tool 17, that is preferably of the usual revoluble disc type and is carried upon the axle 16.

The supporting arm 14 consists of a V-shaped body portion 18 which supports at one end of the V, upon the axle 16, the work tool disc 17, and which is itself pivotally mounted in the end of a horizontal shaft 19 mounted in bearings 20 on the carriage 13. A handle 21 cast integral with or otherwise secured to the body portion 18, and projecting backwards therefrom, provides a convenient means for controlling the action of the work tool 17 against the tire. A stop collar 22 is secured to the free end of the shaft 20 and serves to keep the shaft in position.

To prevent rotation of the shaft 19 during the fabric working operation, we employ the use of a latch pin 23 mounted in an aperture 24 in one of the bearings 20 and projected into one of a pair of oppositely bored recesses 25 in the shaft 19. When it is desired to swing the arm 14 to dispose the work tool 17 in contact with the opposite side of the core, the latch pin 23 is raised sufficiently to clear the recess 25, the arm 14 is vertically swung approximately 180° and the latch is then released and drops into the opposite recess 25.

Operation.

Assuming a fresh ply of fabric has been laid upon the core, the operator will place the core in rotation, swing the arm 14 to the correct side of the core, so that the work tool when in use will favor the 45° angle of the thread, as is desired, slowly feed the carriage 12 forward by means of the hand wheel and screw and hold the tool in contact with the fabric by means of the handle 21. Upon completion of the operation, the carriage is retracted, the latch 23 is raised, the arm 14 swung vertically approximately 180° the direction of the core reversed and the forming operation is then repeated.

What we claim is:

1. A tire machine including a rotatable core, a driving mechanism for rotating the core, means whereby the direction of rotation may be reversed at will, a forming element for working a ply of fabric down upon the core and means for mounting the forming element comprising an elongate axial member disposed in the plane of the core whereby the forming element may be transposed from one side of the core to the other.

2. A tire machine including a rotatable core, a driving mechanism for rotating the core, means whereby the direction of rotation may be reversed at will, a forming element for working a ply of fabric down upon the core, and means for mounting the forming element whereby said element can be turned vertically through an angle of substantially 180° for operation on either side of the forming core at will.

3. A device for stitching fabric plies on a tire forming core, and a mounting therefor comprising an elongate axial member disposed in the plane of the core and substantially radially thereof whereby said device may be swung through an angle of substantially 180° to operative position upon either side of the core as desired.

4. A device for working fabric plies on a tire forming core, and a mounting therefor comprising an elongate axial member disposed in the plane of the core and substantially radially thereof whereby said device may be turned vertically through an angle of 180° to operatively position the device on either side of the core as desired.

5. Means for working fabric plies on a tire forming core, comprising a pivotally mounted bar, and an arm having a forming element rotatably mounted at one end thereof, and having a handle at the other end thereof, said arm being provided with an offset extension connected to said bar whereby the arm can be turned vertically through an angle of substantially 180° to position the forming element for operation on either side of the core at will.

6. A tire machine including a rotatable core, a driving mechanism for rotating the core, means whereby the direction of rotation may be reversed at will, a forming element for working a ply of fabric down upon the core, means for mounting the forming element whereby said element may be turned vertically through an angle of substantially 180 degrees for operation on either side of the forming core at will, and means for latching said first means to maintain the forming element in operative position.

7. A tire machine including a rotatable core, a driving mechanism for rotating the core in either direction, a carriage adapted for reciprocatory movement with respect to the core, a stitcher element for working material upon the core, and a composite stitcher mounting comprising a rotatable member journalled upon the carriage in the plane of the core whereby the stitcher may be transposed from one side of the core to the other and a second member adapted for adjustment in the plane of the journalled member to position the stitcher laterally of the core.

8. A tire machine including a rotatable core, a driving mechanism for rotating the core in either direction, a carriage adapted for reciprocatory movement with respect to the core, a stitcher element for working material upon the core, a composite stitcher mounting comprising a rotatable member journalled upon the carriage in the plane of the core whereby the stitcher may be transposed from one side of the core to the other and a second member adapted for adjustment in the plane of the journalled member to position the stitcher laterally of the core, and means for latching the journalled member to maintain the stitcher element in either of its transposed positions.

In witness whereof, we have hereunto signed our names in the presence of two subscribing witnesses.

ALBERT SHAW.
WILLIAM K. GLENNON.

Witnesses:
PHILIP E. BARNES,
G. E. KEATING.